(12) United States Patent
Burton (10) Patent No.: US 9,442,857 B2
(45) Date of Patent: Sep. 13, 2016

(54) DYNAMIC MEMORY ESTIMATIONS FOR MEMORY BOUNDED APPLICATIONS

(71) Applicant: Adobe Systems Incorporated, San Jose, CA (US)

(72) Inventor: Tyler K. Burton, Seattle, WA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 10 days.

(21) Appl. No.: 14/506,222

(22) Filed: Oct. 3, 2014

(65) Prior Publication Data

US 2016/0098348 A1    Apr. 7, 2016

(51) Int. Cl.
*G06F 12/08*     (2016.01)
*G06F 12/02*     (2006.01)

(52) U.S. Cl.
CPC ....... *G06F 12/0862* (2013.01); *G06F 12/0215* (2013.01); *G06F 2212/1024* (2013.01); *G06F 2212/602* (2013.01)

(58) Field of Classification Search
CPC ........... G06F 12/0215; G06F 12/0862; G06F 2212/1024; G06F 2212/455; G06F 2212/602
See application file for complete search history.

(56) References Cited

U.S. PATENT DOCUMENTS

| | | | | |
|---|---|---|---|---|
| 2003/0105926 A1* | 6/2003 | Rodriguez | ............... | G06F 12/04 711/129 |
| 2005/0166153 A1* | 7/2005 | Eytchison | ............. | G06F 3/0482 715/747 |
| 2006/0070012 A1* | 3/2006 | Milener | ................ | G06F 3/0482 715/822 |
| 2009/0112975 A1* | 4/2009 | Beckman | ................ | H04L 67/26 709/203 |
| 2014/0101170 A1* | 4/2014 | Parekh | .............. | G06F 17/30749 707/749 |
| 2014/0317184 A1* | 10/2014 | Weaver | ................... | H04L 67/22 709/204 |
| 2015/0026415 A1* | 1/2015 | Clausen | .............. | G06F 12/0862 711/137 |
| 2015/0169826 A1* | 6/2015 | Hasegawa | .......... | A61B 10/0233 715/840 |
| 2015/0350369 A1 | 12/2015 | Ilsar et al. | | |
| 2015/0355795 A1* | 12/2015 | Falkenburg | ........... | G06F 3/0483 715/201 |

* cited by examiner

*Primary Examiner* — Hal Schnee
(74) *Attorney, Agent, or Firm* — Finch & Maloney PLLC (57) ABSTRACT

Techniques are disclosed for improving application responsiveness, and particularly applications used to present rich media content, by precaching nearby but not-yet-displayed content, so that content can be immediately ready to display. A precache window can be used to determine what undisplayed content is precached, in accordance with an embodiment. The size of the precache window, and hence the amount of content that can be precached for later display, is dynamic in nature and is determined based on a number of variables, such as the distance of the content from being visible and the estimated memory consumption of the content. In addition, the dynamic precache window can be recalculated in real-time in response to events and/or as the user interacts with the content in a way that causes a significant enough change to warrant a new memory limit estimate be performed. Out-of-memory errors may be handled by reducing precache window.

20 Claims, 4 Drawing Sheets

DYNAMIC MEMORY ESTIMATIONS FOR MEMORY BOUNDED APPLICATIONS

FIELD OF THE DISCLOSURE

This disclosure relates to techniques for managing computing system resources, and more particularly, to dynamic memory estimation for purposes of efficiently precaching digital content to be consumed.

BACKGROUND

Digital content can be consumed on any number of computing systems, such as desktop computers and mobile computing devices such as laptops, tablets, and smartphones, to name a few examples. Typically, the content is aurally and/or visually presented to the user via some application executing on the device, such as a browser, media player, or other content-presenting application. Many such applications, particularly when executing on mobile devices, have strict memory limitations. Surpassing these limitations can result in any number of unintended events, including crashing of the device, application slowdown, or other undesirable behavior. So-called rich or mixed media content, typically including some combination of text, images, audio, graphics, and/or video, can be particularly memory and processing intensive to present to the user.

DETAILED DESCRIPTION

Techniques are disclosed for improving application responsiveness, and particularly applications used to present rich media content, by precaching nearby but not-yet-displayed content, so that content can be immediately ready to display to the user. A precache window can be used to determine what undisplayed content is precached, in accordance with an embodiment. The size of the precache window, and hence the amount of content that can be precached for later display, is dynamic in nature and is determined based on a number of variables. In one example embodiment, this determination is based on the distance of the content from being visible, the estimated memory consumption of the content, the screen dimensions of the target computing device, and the maximum memory limit of the application on the target computing device. Any one or more of these variable factors can be considered in the determination. In addition, the dynamic precache window or memory limit can be recalculated in real-time automatically in response to some event (e.g., automatic webpage refreshing when data gets stale), and/or as the user navigates or otherwise interacts with the content in a way that causes a significant enough change to warrant a new memory limit estimate be performed. In the event that actual memory needed to successfully present the content is significantly underestimated, a fallback position is to significantly reduce the size of the precache window before the application or computing device becomes unstable and crashes.

For purposes of clarity, note that 'caching' and 'precaching' are distinct terms of art and subtly different. In more detail, 'caching' implies that data has been requested and used earlier, and is being maintained locally with the expectation of future access. On the other hand, 'precaching' implies that data (e.g., digital content) is loaded in advance of its use and maintained locally with the expectation of future use. To this end, precaching tends to be more appropriate in certain applications, such as in the case of fetching bitmaps and/or other imagery or rich content before that content is displayed to improve responsiveness of a given application used for displaying that content. Note that even though the content is precached, it may never actually be displayed, depending on user input.

The term "content" or "digital content" as used herein generally refers to any type of information that can be electronically displayed and/or aurally presented to a user, such as text, images, audio, video, and graphics. Such content may generally come in the form of one or more content objects each having a size (typically in bytes) associated therewith. In some cases, the user can interact with the content electronically, by way of some user interface mechanism such as a touchscreen or mouse and keyboard arrangement. Content may be included in any type of presentable documents or data files, such as presentations, slideshows, electronic books and magazines and newspapers, applications, webpages, e-mail and text messages, and other such electronic files. Content can, in some cases, include metadata (i.e., data about data) that may not be directly accessible by a user, such as size information (bytes needed to store in memory), message routing information, timestamps, authentication credentials, browser cookies, etc. In a more general sense, content as used herein includes any type of content that can be precached as provided herein in anticipation of that content being called or otherwise requested for presentation to a user as the user navigates that content. Other examples of precachable content will be apparent in light of the present disclosure, and the present disclosure is not intended to be limited to any particular type.

The term "display" or "display screen" as used herein generally refers to an electronic display for presenting visual content to a user, or a portion of such a display such as a so-called viewing pane or window (not to be confused with the precache window) that is presented somewhere on a display.

General Overview

Some software applications are memory intensive, and providers of a given application have little control over certain conditions that contribute to low memory situations. These conditions include, for example, varying memory heap sizes between devices, varying screen resolutions between devices, and varying content created by third-parties that the given application must render or otherwise present. In any case, and as previously explained, exceeding memory limitations of a given application generally results in undesirable behavior, particularly with digital content including rich or mixed media. For example, rendering interactive magazines and web pages typically includes rendering images, video, audio, and other content on a moving canvas. In such cases, it may be desirable to precache nearby pages so that they can be immediately ready to display to the user. By precaching the mixed media content in advance, a given magazine viewer application can achieve a tradeoff of being more responsive in exchange for consuming more memory. The improved responsiveness generally results because accessing content from a main memory where the precache is located is much faster than accessing content from a disk drive. However, statically precaching content up to a set distance outward from the primary/visible content may not always be sustainable in various situations. For instance, a given application may add support for additional content types, thereby substantively changing the precache requirements. This issue may be addressed, for example, by using a smaller static precache window. However, such a solution may still be prone to out-of-memory errors, and also may further be susceptible to slower rendering speeds in a relatively significant number of cases.

Thus, and in accordance with an embodiment of the present invention, techniques are disclosed for improving application responsiveness, and particularly applications used to present rich media content such as digital magazines and webpages. The techniques include precaching nearby but not-yet-displayed content, so that content can be immediately ready to display to the user if needed, depending on how the user navigates or otherwise interacts with the currently displayed content. By precaching out-of-view content in advance of its display, the application is more responsive. The size of the memory allocated for precaching, and hence the amount of content that can be precached for later display, can be estimated or otherwise determined using a window-based method wherein the size of the window is dynamic and is based on a number of variables. In one specific example embodiment, the determination of the dynamic precache window size is based on at least one of the distance of target content from being visible, the estimated memory consumption of the target content, the screen dimensions of the device, and the maximum memory limit of the application on the device. In any case, the memory limit estimate for precached content can be recalculated in real-time as the user moves around on the canvas or interacts with the content in a way that causes a significant enough change to warrant a new memory limit estimate be performed. Likewise, the memory limit estimate for precached content can be automatically recalculated in real-time in response to some event(s) that occurs. For example, in one such embodiment, if something on the screen changes automatically, without user interaction, after an arbitrary length of time (e.g., 10 seconds), the precache window estimates may be updated. Other non-user initiated event examples that may automatically cause the memory limit estimate for precached content to be recalculated include an application having the ability to launch and play a slideshow or some other rich content not previously presented and accounted for, or automatically refreshing a web page refreshing when data gets stale. In any such cases, the precache window can be used to effectively define an amount of content or set of content objects outward from a central point, and as the user moves around the canvas to explore the content or the canvas otherwise changes, the amount of memory required to precache the content within the precache window may vary. Thus, the size of the precache window may also vary, thereby maintaining a dynamic precache memory limit. In some example embodiments, in the event that the amount of needed precache memory is significantly underestimated, a fallback position is to significantly reduce the size of the precache window before the application/device becomes unstable and crashes.

By precaching a variable amount of multimedia content for later display as provided herein, an application can remain optimally or otherwise sufficiently responsive while also not consuming more memory than is needed or otherwise available for use. Precache memory amounts can be based off of, for example, content groupings (e.g., multiple content objects or pages of mixed media content), and memory estimates for each content object within a given group, such that each content group has an overall memory estimate associated therewith. So, when that content group is included in the precache window, that overall memory estimate of the group is assumed necessary for precaching that group. Note that a given content group may include a plurality of individual content objects. For instance, a content group may be a single page of paginated content that includes both text and image content objects, or a cluster of content objects located proximate to one another, or even a plurality of pages with each page having one or more content objects. In a similar fashion, precache memory amounts can be based off of individual content objects (rather than content groups, or in addition to content groups), and a memory estimate for each such individual content object. The precache window can be sized to include any number of such content groups and/or individual content objects, so long as the cumulative memory estimate of all the content objects in the window doesn't exceed a maximum memory threshold. The memory threshold can be set, for example, based on the memory constraint of the application or device. This threshold can be hard-coded or user-defined for a given application, in some embodiments. Alternatively, the computing device can compute the memory threshold based on the available memory and memory demands of the given application. In a more general sense, a memory threshold can be provided in the context of a memory bounded application, regardless of what has necessitated the corresponding memory constraint.

As will be appreciated in light of this disclosure, less content is precached on devices with less memory (wherein the maximum memory threshold is set appropriately low). Likewise, less content is precached on devices that consume more memory for a given piece of content. Likewise, less content groupings are precached when the precached content groupings consume more memory. If the user does something to invalidate the memory estimates, or some user-independent event occurs that invalidate the memory estimates, then the memory consumption and precache limits can be re-estimated in real-time and as needed. If actual memory consumption far exceeds the current precache limits, the memory consumption can be re-estimated and precaching of the failing content can be retried using the new limits. As will be further appreciated in light of this disclosure, note that this latter scenario where device memory limitations are exceeded will not occur so long as memory estimates of the precached content are correct.

There are a number of advantages associated with using the techniques provided herein. For example, in one embodiment, precaching content permits fast rendering as the user navigates between individual pieces of content (e.g., picture-to-picture slideshow), or content groups such as pages of content (e.g., virtual magazine). In addition, the techniques can be used to allow a given application to precache a variable amount of multimedia content instead of precaching a static amount, in accordance with some embodiments.

Such a dynamic precaching technique can be used over other solutions if, for example, the given application has to display an unpredictable amount of multimedia content on a wide range of devices types. So, for instance, a given computing device may be configured to automatically implement dynamic precaching for such applications. In other such cases, dynamic precaching can be enabled or otherwise configured by the user, if so desired. As will be further appreciated, note that dynamic precaching avoids various problems associated with a static precaching scheme, including less than optimal precaching (e.g., due to use of significantly more precache memory than is actually needed), slower content display (e.g., due to use of insufficient precache memory), content failing to display (e.g., due to use of too much precache memory), and application instability (e.g., due to use of too much precache memory).

Example Use Cases for Dynamic Precaching of Content

Figure 1A:
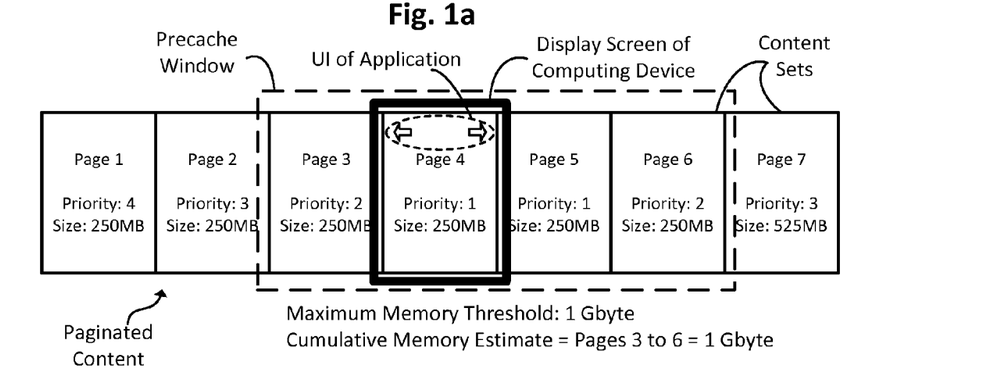
FIGS. 1a-c collectively illustrate an example use case for precaching a variable amount of content using a dynamic memory estimation, in accordance with an embodiment of the present invention.
Figure 1B:
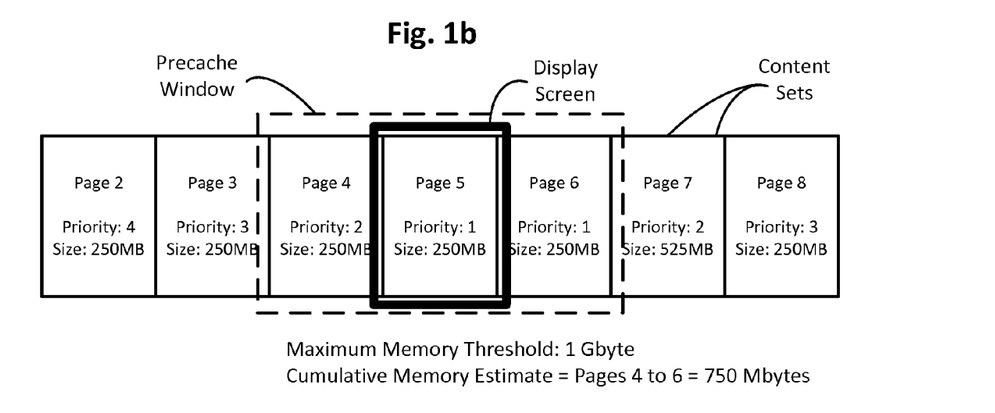
Figure 1C:
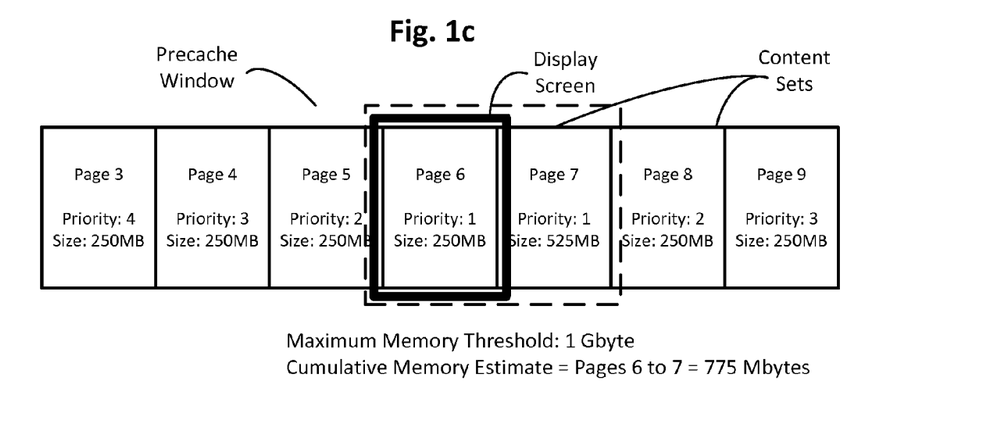

FIGS. 1a-c collectively illustrate an example use case for precaching a variable amount of content using a dynamic memory estimation, in accordance with an embodiment of the present invention. As can be seen in FIG. 1a, a computing device configured with a display screen is being used to consume some paginated content. The computing device can be any type of computer, whether it be mobile or not, such as a desktop computer, laptop computer, workstation, tablet computer or smartphone. In any such cases, a user can interact with the computing device to explore the content. Any number of user interface mechanisms can be used to facilitate this interaction. In one example case, the user interface mechanism includes a touch-based user interface (UI) where the display screen is a touchscreen and the user can navigate through the content using swipe gestures or by tapping various virtual control features (e.g., Next Page and Back UI buttons). Another example touch-based UI that could be used is a trackpad that allows the user to move a cursor around the display and click or otherwise select various UI control features provisioned thereon. Note in such a case that the display screen can be any display type (e.g., touchscreen, regular LED, CRT display, or flat panel display). In still other non-touch-based embodiments, the display screen can be a regular LED, CRT, or flat panel display and the user interface mechanism includes a keyboard and mouse arrangement that allow the user to move a cursor around the display and click or otherwise select various UI control features provisioned thereon. In short, the techniques provided herein can be used with any type of computing device, with any display type, and with any user interface scheme, and need not be limited to any particular computing configurations, as will be appreciated in light of this disclosure.

As can be further seen in FIG. 1a, an application is executing on the computing device and includes a user interface (UI) that allows the user to interact with the content. In this example case, the application could be, for instance, a magazine viewer application or any other application that could be used to present paginated content. The example UI includes page-forward and page-backward arrows that can be selected by the user when navigating the content. Other example embodiments may include a UI that allows the user to navigate back and forth in the content using swipe gestures (no visible UI control features needed). In some applications, note that the manner in which the content is displayed may be configurable or otherwise vary. For example, content may be displayed one page at a time as shown, or multiple pages may be simultaneously shown. Likewise, the orientation of the content (landscape or portrait) can be changed to accommodate factors such as the device orientation and preferred layout of the content. In a more general sense, the application can be any application that can be used to present navigable content, whether visually and/or aurally presented, and that may be memory bound for whatever reason.

With further reference to FIG. 1a, a precache window is depicted to symbolize the amount of content that can be precached given the current status of the content. As will be appreciated in light of this disclosure, the precache window does not actually manifest; rather, it is essentially transparent to the user and is used herein to assist in explaining how precaching can be dynamically implemented. In this example case, page four of the content is currently being presented via the display screen (which could also be a viewing pane), and pages three through six are precached as indicated by the dashed line. Note that each of the pages is associated with a priority and a size.

The priority defines which of the pages will be precached (higher priority pages are precached prior to lower priority pages). As can be seen, each of the currently displayed page and the next page to be displayed is assigned a priority of 1. This example case presumes that the reader is more likely to page forward than backward, hence the next page after the currently displayed page is assigned a priority of 1 and the first page in the backward direction is assigned a priority of only 2. To this end, numerous other schemes can be implemented to anticipate or otherwise predict what undisplayed content a user is most likely to call for next. Subsequent pages in either direction are assigned a priority that is sequentially incremented from the previous page.

The size defines the memory estimate (in bytes) that the corresponding page will take up in memory if precached. The memory estimate for a given page can be, for example, encoded in metadata of that page and/or interrogated prior to or contemporaneously with the precaching process. While text-based content is a relatively minor contributor to memory use, heavier content such as images, video, audio and some graphics will likely be the dominant contributors to the memory estimate of a given page. So, in one example embodiment, text can be assumed to be negligible or some default amount (e.g., 10 Kbytes per page), and other content objects such as embedded images, video files, audio files, and graphics files, can each be queried or otherwise interrogated to determine a corresponding memory estimate (in bytes or other suitable units) for that particular content object. The overall memory estimate for a given page can then be computed by adding each of the identified or otherwise estimated content sizes associated with that page. With respect to precaching video and audio files, the memory estimate can be based off of the duration precached (e.g., number of milliseconds) and the bitrate of the file. With respect to precaching vector-based images (e.g., pdf or svg), the memory estimate can be based off of the screen size and number of bits per pixel. With respect to precaching standard raster images (e.g., png or jpg), the memory estimate can be based off of image dimensions and number of bits per pixel.

As can be further seen in the example case of FIG. 1a, the application is memory bound or otherwise constrained with respect to how much memory it will be allowed to use. To this end, a maximum memory threshold of 1 Gbyte has been set for this particular application on this particular computing device. Of course, this threshold will vary from one case to the next and this specific example is not intended as a limit to the present disclosure. Given that each of pages one through six have a memory estimate of 250 Mbytes, then the four pages having the highest priorities can be precached.

Hence, the precache window is symbolically depicted as including pages three through six.

Now, as previously explained, as the user navigates or interacts with the displayed content, the precaching scheme adapts and changes as needed. For instance, and as shown in FIG. 1b, the user has paged forward by one page and page five is now being displayed. Further note that page seven has a relatively much higher memory estimate, at 525 Mbytes, relative to the other pages each having a memory estimate of 250 Mbytes. Following the assigned priorities, pages five, six and four are selected for precaching, as indicated by the now smaller precache window. Page seven cannot be precached at this time given its current priority, because that would cause the maximum memory threshold of 1 Gbyte to be exceeded. In some such situations, note that the precaching methodology may be configured to skip page seven and proceed to the next page (based on page priorities and/or other predictive factors). In this example scenario, that next page is page three, which could be included in the precache without causing the maximum memory threshold to be exceeded, in accordance with another example embodiment.

As the user continues to navigate or interact with the displayed content, the precaching scheme continues to adapt and change as needed. For instance, and as shown in FIG. 1c, the user has again paged forward by one page and page six is now being displayed. Following the assigned priorities, only pages six and seven are selected for precaching, as indicated by the now even smaller precache window. Neither of page five or page eight can be precached at this time given the corresponding priorities, because that would cause the maximum memory threshold to be exceeded.

So, the cumulative memory estimate selected for precaching in this example use case scenario changes from 1 Gbyte (pages three to six, in FIG. 1a), to 750 Mbytes (pages four to six, in FIG. 1b), to 775 Mbytes (pages 6 and 7, in FIG. 1c). Hence, a dynamic precache memory limit is demonstrated. Numerous other use cases will be appreciated in light of this disclosure. Note that while this example embodiment shown in FIG. 1a-c uses paginated content, wherein each page effectively represents a content group or set that can be dynamically selected for precaching, other embodiments may use content that is not paginated, such as a webpage that is effectively one large page that cannot be displayed all at once and has scroll bars or other controls that allow the user to move around or otherwise explore that single page of content.

Figure 2A:
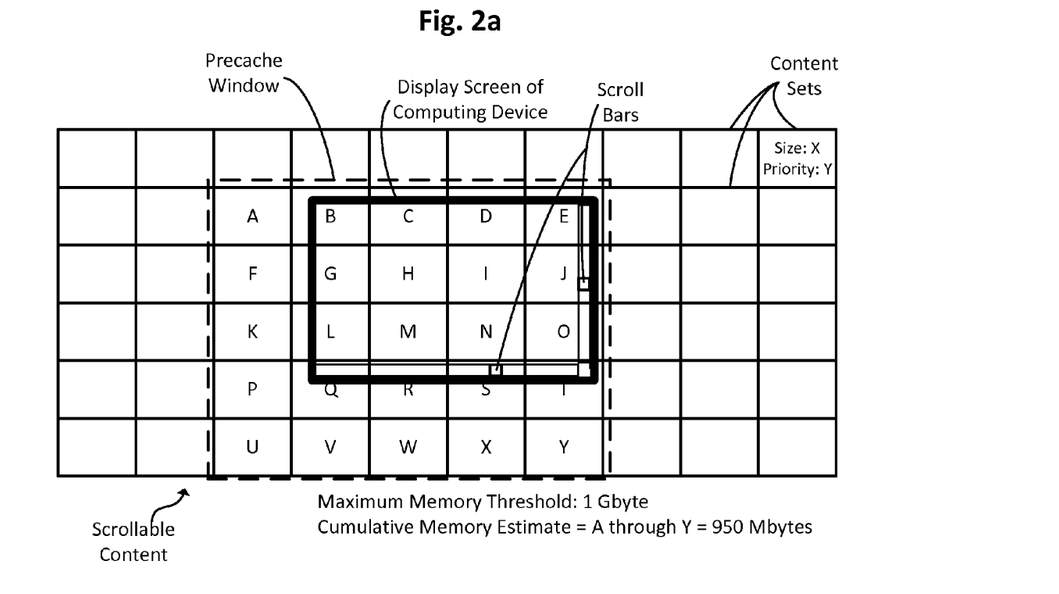
FIGS. 2a-b collectively illustrate another example use case for precaching a variable amount of content using a dynamic memory estimation, in accordance with an embodiment of the present invention.
Figure 2B:
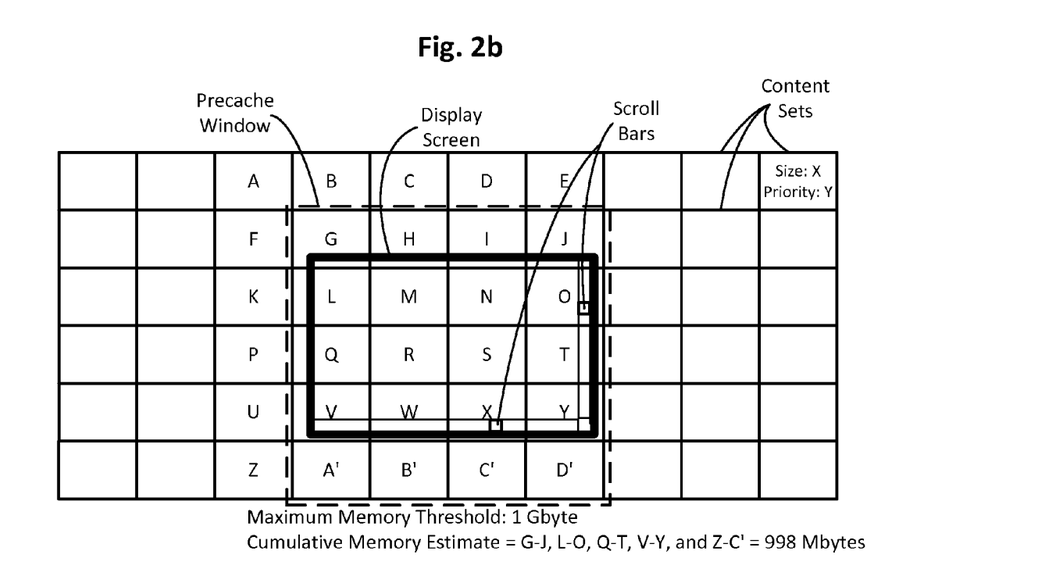

FIGS. 2a-b collectively illustrate one such example use case, in accordance with another embodiment of the present invention. The previous relevant discussion with respect to the computing device, display screen, application and precache window is equally applicable here. A primary difference with this embodiment is that the content is not paginated. Rather, it includes a scrollable field of content that effectively includes a plurality of content sets. The content sets are depicted as squares for purposes of simplification. As will be appreciated, each content set may include one or more content objects, including text, images, video, audio, and/or graphics. As will be further appreciated, note that the content sets need not be divided into a grid or otherwise uniformly defined as shown. Rather, the division can be irregular if so desired and likely will be, particularly given content such as a webpage having a number of diverse and randomly placed content objects embedded therein. The Application can be, for example, a browser or any other application having a user interface that facilitates scrolling of content in one or more directions. Numerous other suitable applications will be apparent in light of this disclosure.

Just as with the content pages of the example embodiment of FIGS. 1a-c, each content set of this example embodiment is associated with a priority (with respect to being displayed) and a size (estimated amount of memory needed to store that content set). This size and priority assignment is generally indicated in FIGS. 2a and 2b by the reference to 'Size: X' and 'Priority: Y' in the upper right corner box representative of one of the given content sets. In one embodiment, the size X is a memory estimate for the corresponding content set (in bytes), and priority Y is the priority of that content set based on the distance of that content set from being displayed. The memory estimates can be in other units if so desired, and the priorities can be set based on any number of other predictive factors, such as prior user behavior (e.g., including the same user, or based on a broader segment of users such as sometimes done with crowdsourcing), the natural flow of the content, directional guidance provided with the content, the type of content and known interests of the user (e.g., content categories known to be liked by the user are more likely to be requested for display), and any other factors that may suggest what undisplayed content may be requested next for presentation (e.g., display for visual content and/or aural presentation for audio content) to the user.

As the user moves the vertical and/or horizontal scroll bars (e.g., with a mouse click-hold-drag gesture), the content presented for display updates accordingly, as does the priority assigned to each content set. In one example embodiment, for instance, the priority assigned to content sets that move closer to being displayed is incremented accordingly, depending on how close to being displayed that content set is. For instance, prior to user input, a given content set is at least a 5 inch scroll distance away from being displayed and is assigned a relatively low priority of 4. However, the user then actually provides a long 4 inch scroll input thereby moving the content set to just outside the viewable window, thereby causing the priority assigned to that content to be increased from a 4 to a 1. In another example case, if the scroll input provided by the user actually moved the content into the displayed content window, then the priority assigned to that content to be increased from a 4 to a 0 (meaning that the content set is currently being displayed).

With reference to FIG. 2a, the currently displayed content sets include B, C, D, E, G, H, I, J, L, M, N, O, Q, R, S, and T. In addition, the currently precached content sets include A through Y. As can be further seen, the cumulative memory estimate for this collection of precached content sets is 950 Mbytes, which is well within the 1 Gbyte maximum memory threshold set for this particular application. Then, the user moves the vertical scroll bar as generally shown in FIG. 2b thereby causing a change in both the displayed content sets and the precached content sets. In particular, the now currently displayed content sets include G, H, I, J, L, M, N, O, Q, R, S, T, V, W, X, and Y. In addition, the currently precached content sets now include G, H, I, J, L, M, N, O, Q, R, S, T, V, W, X, Y, A', B', C', and D'. The cumulative memory estimate for this collection of precached content sets is 998 Mbytes, which is just under the maximum memory threshold set for this particular application. So, in this example case, twenty-five content sets having a total memory estimate of 950 Mbytes were precached in the viewing scenario shown in FIG. 2a, and twenty content sets having a total memory estimate of 998 Mbytes were precached in the viewing scenario shown in FIG. 2b. This would suggest that at least one of the content sets included in the group of A', B', C', and D' has a relatively large size compared to other content sets, and/or that at least one of the content sets included in the group of B, C, D, and E has a relatively small size compared to other content sets. In any case, the user's interaction necessitated a smaller precache window (from 25 content sets to 20 content sets). Given the assigned priority scheme, the content sets in the group of A, F, K, P, U, and Z were dropped from the precache in effort to make room for the higher priority content sets of A', B', C', and D'. Such a priority scheme may favor the vertical scroll direction over the horizontal scroll direction, or perhaps there is no horizontal scroll direction (such as with some webpages). So, in one such case, content sets directly above and below the currently displayed content can be given a higher priority than any other surrounding content. The next range or group of upper and lower content sets can be assigned the next priority, and so on, until all content sets that might be displayable based on the next user input are assigned a priority, in accordance with an embodiment. In this way, the priority for each content set can be incremented based on distance of that content set from being displayed (or distance from some central display point) increases, and/or on the likelihood that content set might be displayed. The likelihood may be determined, for instance, based on that user's prior activity and/or a user group's prior activity, and/or some other predictive rationale that can be used to anticipate a user's next input selection so that content sets can be ranked or otherwise prioritized for precaching purposes.

Thus, one example embodiment provides effectively provides distance-based memory estimations for groupings of digital content on a computing device screen. The dynamic precaching process can be implemented within a given application, or at a more global level such as in the operating system of a computing device. A content group or set may include one or more content objects, and in some example cases is a page of content, as previously explained. The content object(s) in a given set or on a given page may include, but is not limited to, images, videos, audio, and web content. As further previously discussed, the content can first be grouped based off of distance from a central set of displayable content objects. The central content set is generally what is visible or immediately usable on the device display screen. This central content set has a memory estimation that is prioritized above all surrounding content sets. Surrounding content sets are prioritized based off of their distance from this central content set. Content sets further away from the central content set can be assigned lower priority than nearer content sets and may not even be permitted to present (display or aurally present) depending on memory limitations and user input. A content object that overlaps more than one grouping will belong to the group with higher priority, in accordance with some example embodiments of the present disclosure.

As will be further appreciated in light of this disclosure, content objects can be grouped in any number of ways (e.g., page based groups, proximity or cluster based groups, and grid based groups, to name a few). Alternatively, grouping content objects can be avoided all together and the methodology can proceed entirely based off of distance of a given content object from the center of the screen or designated viewing area. In some cases, distance can be based off of, for example, scroll distance or user interaction that leads to a new location or changes the state of a displayable content set on the screen. For example, a link on the screen could take the user to a page that is many pages away from the current point displayed. Also, a UI button press or some other interaction could cause a displayable content to change state and display something entirely different for one of the displayable content objects in the current set. Numerous scenarios will be apparent in light of this disclosure.

As also previously explained, memory estimations are an estimate of how much each content set will consume when precached. Each content object is responsible for providing a memory estimate when queried. Each content object may be asked or otherwise caused to load into precache more or less based off of memory limitations and performance optimizations. Further note that a content item or object could also be a content set because there can be nesting of content items. For example, a content set may include a scrollable frame that contains multiple child content objects. Both the scrollable frame and each of its children can provide a memory estimate when queried, in accordance with an embodiment. In one such embodiment, the scrollable frame would query each of its nearby children for a memory estimate and then return the sum of those estimates. The memory estimate of the scrollable frame could vary, for example, depending on its current scroll position and distance from the central set of content. Scrollable frames may offer unlimited layers of nesting (scrollable frame inside a scrollable frame inside a scrollable frame, etc). Other nested content situations can be treated or otherwise processed in a similar fashion.

If the computing device does not have enough memory to precache some content that is lower priority than something else, then the low priority content might be asked to only partially load or not load at all, in some example embodiments. Even if the device has enough memory to precache everything, the methodology may be configured to choose not to precache everything because performance could degrade. For example, creating and rendering displayable objects in an Android-based operating system generally happens on a main thread. By doing too many things on the main thread, the experience for user interaction may be degraded. Also, such practice may consume more memory than a given application needs, which is generally frowned upon as being unfair to other applications on the device.

Methodology

Figure 3:
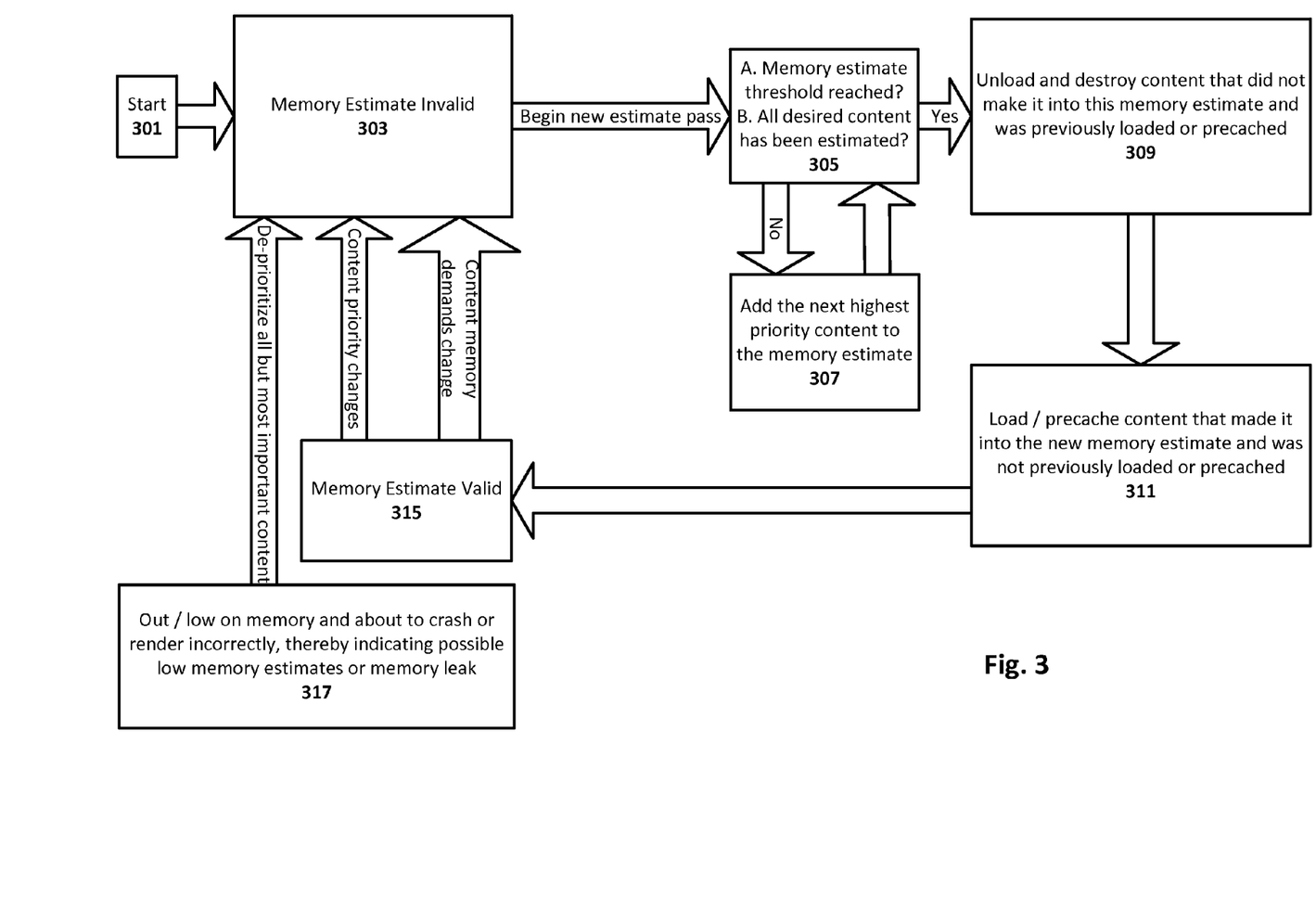
FIG. 3 illustrates a methodology for precaching a variable amount of content using a dynamic memory estimation, in accordance with an embodiment of the present invention.

FIG. 3 illustrates a methodology for precaching a variable amount of content using a dynamic memory estimation, in accordance with an embodiment of the present invention. The method may be carried out on any computing device for displaying content. As will be appreciated in light of this disclosure, the various depicted functionalities can be implemented in software, such as a set of instructions (e.g. C, C++, Objective C, JavaScript, BASIC, etc) encoded on any computer readable medium (e.g., disk drive, server, or other suitable non-transient medium or computer program product), that when executed by one or more processors, cause the various methodologies provided herein to be carried out. In other embodiments, the functionalities may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number embedded routines for carrying out the functionality described herein. In a more general sense, any suitable combination of hardware, software, and firmware can be used, as will be appreciate.

Now with reference to the specific example embodiment shown in FIG. 3, the method instantiates at 301 and defaults to the memory estimate being invalid at 303. A maximum memory threshold is set before a memory estimate pass. A memory estimate pass involves starting with the central content set (one or more content objects) and then iterating outward over all nearby content sets, as shown at 305 and 307. In operation, the memory estimate begins at zero and then increments by each content set's memory estimate as a running total. Incrementing the memory estimate stops when either the memory threshold is reached (at 305A) or the maximum amount of content initially desired to prepare has been estimated (305B). In general, any content that was unable to make it within the memory estimate threshold is to not be prepared or destroyed if it was already prepared. This content should not consume any memory. So, as shown at 309, any content that was previously precached but now falls outside of the maximum memory estimate is unloaded and destroyed prior to any of the estimated content being permitted to load. This allows the computing device a chance to reclaim memory before other content begins causing the allocation of additional memory. This also allows for assets within the destroyed content to be recycled by the content doing new object allocations, in an embodiment.

The method continues at 311, wherein the content selected during the iterative process at 305 and 307 and that was not previously loaded into the precache is now loaded into the precache. As the user interacts with content, or some user-independent event occurs that causes a change in content, the existing memory estimations may become invalidated and a new memory estimation pass may be necessary. So, the method further includes reevaluating the memory estimates in response to user interactions or events, as indicated at 315. User interactions may include navigating to a new central set of content or interacting with a central set of content in such a way that the content's memory estimate would be increased enough to warrant a new memory estimation pass. Events may include, for example, a page refresh or an auto-launch of an application that presents content within a viewing pane on the display screen thereby changing current content memory estimates. Numerous other user interactions and events will be apparent. In any case, the user interaction or event may cause changes in content priority or a change in content memory demands, as shown at the output of 315. If so, the memory estimate is invalidated at 303 and the process repeats. The new memory pass may be a full memory pass or it may be restricted only to the subset of content that changed. If the subset of content changes significantly enough, memory estimates may need to be propagated to higher levels (larger content groupings).

In the event that the memory estimates are too low for the actual memory consumption needed to present the content, the application may become unstable, slow, or crash. In Java-based systems, an OutOfMemoryError can be thrown in such situations. OutOfMemoryErrors are included in a set of unrecoverable errors and some documentation recommends that they not be handled. To this end, the application is generally expected to crash after these kinds of errors. However, instead of crashing, an embodiment of the present disclosure is configured to handle these errors by scaling back the amount of content permitted to be loaded (i.e., making the precache window smaller), as indicated at 317, wherein the memory is full or otherwise low (no more memory available) and the application is about to crash or render incorrectly, thereby indicating possible low memory estimates or a memory leak. In such cases, the methodology includes effectively decreasing the maximum memory estimation threshold (making the precache window smaller), by de-prioritizing all but the most important content (e.g., visible content only, in some cases). Content that was previously estimated to fit into the precache window will be unloaded and any content that is still permitted to load will receive a retry notification. Thus, if the content previously failed to prepare, due to running out of memory, it will now have another chance to prepare. Numerous other embodiments configured to provide distance based mixed media memory estimations with memory estimate reductions to permit retries on failure will be apparent in light of this disclosure.

As will be further appreciated, the methodology is particularly beneficial for applications expected to handle multimedia that potentially introduce instability in the application due to increasing the variability of memory consumption. Without the method, such situations may result in failing to render content, getting in retry loops, our outright crashing. This instability is found to depend heavily on the device being used and third-party content being rendered.

Example Computing System

Figure 4:
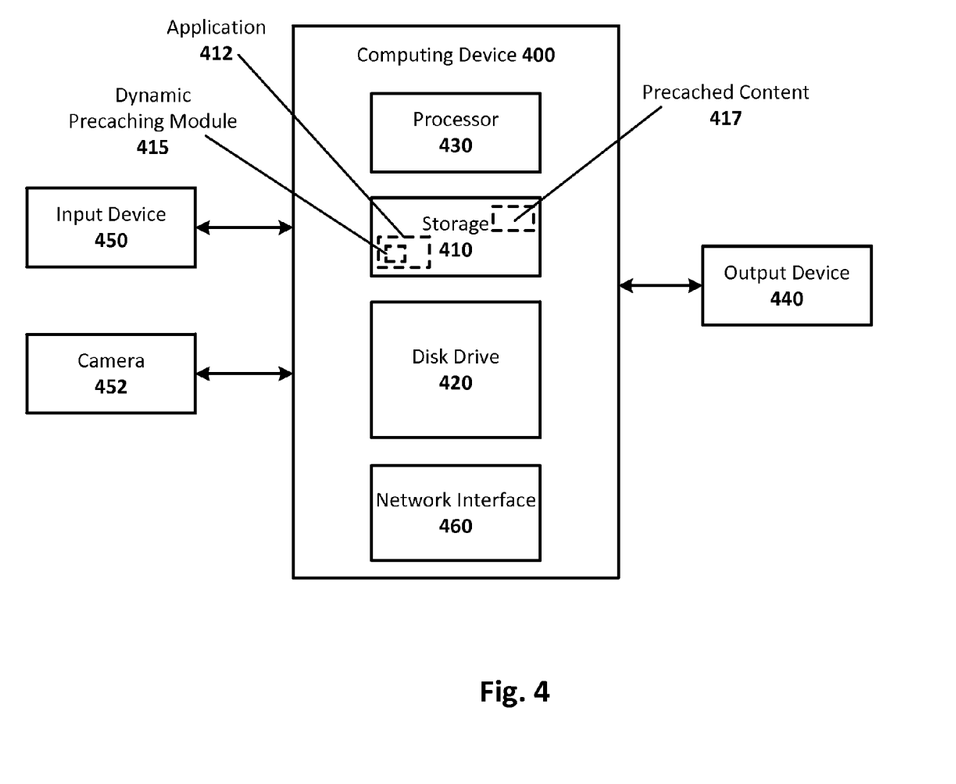
FIG. 4 is a block diagram representing an example computing device that may be used to implement a process for precaching a variable amount of content using a dynamic memory estimation, in accordance with an embodiment of the present invention.

FIG. 4 is a block diagram representing an example computing device 400 that may be used to implement a process for precaching a variable amount of content using a dynamic memory estimation, in accordance with an embodiment of the present invention. The computing device 400 may be any computer system, such as a workstation, desktop computer, server, laptop, handheld computer, tablet computer, mobile computing or communication device (e.g., smartphone), or other form of computing device that has sufficient processor power and memory capacity to perform the operations described in this disclosure and is capable of displaying, or otherwise presenting for display, content.

The computing device 400 includes a storage 410 and disk drive 420. Although one of each is shown, other embodiments may include multiple such storages 410 and/or disk drives 420. The storage 410 may include any type or types of fast-access computer system memory, such as random access memory (RAM), read only memory (ROM), Flash, or other semiconductor-based storage medium that allows for relatively fast access by the processor 430. As can be seen in this example case, the storage 410 can be used to store application(s) 412 that are currently being executed by the processor 430 (processor workspace memory). In one example scenario, for instance, in response to a user launching a desired application 412 (e.g., magazine viewer or browser), the executable code for that application 412 is retrieved from the disk drive 420 and loaded into the storage 410 for execution by the processor 430. In this specific example embodiment, the application 412 is programmed or otherwise configured with a dynamic precaching module 415, which when executed carries out the dynamic precaching methodologies as provided herein, such as the example shown in FIG. 3. As can be further seen, the storage 410 includes precached content 417, which can be used for purposes of improving responsiveness of the application 412 with respect to displaying content, as variously discussed herein. Note that the application(s) 412 may be loaded into a physically different memory device 410 than the memory 410 used for precaching content 417. In still other embodiments, both the application(s) 410 and precached content 417 are stored in different sections of the same storage device 410. Numerous other storage schemes can be used, as will be appreciated in light of this disclosure, and the present disclosure is not intended to be limited to any particular one.

Note that the dynamic precaching module 415 need not be included in an application 412. For instance, the dynamic precaching module 415 may be a separate and distinct module that is called by applications or the operating system when a dynamic precaching mode is enabled (e.g., enabled by user, or automatically by the operating system in response to detecting content having varying memory demands). To this end, the dynamic precaching module 415 may be a plug-in or individual application or other executable module that can be enabled and executed on demand as needed, or may be included in the operating system. Numerous other configurations will be apparent in light of this disclosure, whether implemented in software, hardware, firmware, or some combination thereof.

The disk drive 420 may include, but not limited to, one or more types of hardware memory, non-transitory tangible media (for example, one or more magnetic storage disks, one or more optical disks, one or more USB flash drives), and the like. The disk drive 420 may store computer-readable and computer-executable instructions or software for implementing various embodiments, and may be provided locally in the computing device 400 or provided separately or remotely from the computing device 400.

As can be further seen, the computing device 400 also includes at least one processor 430 for executing computer-readable and computer-executable instructions or software stored in the storage device 410 and disk drive 420 and other programs for controlling system hardware. Note that the processor 430 may also include a cache for purposes of improving performance of the device 400. In some embodiments, this on-board processor cache may be used to dynamically precache content as provided herein. Virtualization may be employed in the computing device 400 so that infrastructure and resources in the computing device 400 may be shared dynamically. For example, a virtual machine may be provided to handle a process running on multiple processors 430 so that the process appears to be using only one computing resource rather than multiple computing resources. Multiple virtual machines may also be used with one processor.

A user may interact with the computing device 400 through an output device 440, such as a touch-sensitive display screen or monitor, which may display content and one or more user interfaces, in accordance with an embodiment. In other embodiments, the output device 440 may be a non-touch display, such as a CRT display, LED, or flat panel display. The computing device 400 may also include other input devices 450 for receiving input from a user such as, for example, a keyboard, a joystick, a game controller, a pointing device (e.g., a mouse, a user's finger interfacing directly with a trackpad, etc.), or any suitable user interface. The computing device 400 may include other suitable conventional I/O peripherals, such as a camera 452 that can generate images that can then be viewed in sequence using the dynamic precaching techniques provided herein, in accordance with an embodiment. Any number of input/output schemes can be used.

The computing device 400 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 400 and performing the operations described in this disclosure. In an embodiment, the operating system may be run on one or more cloud machine instances.

As previously explained, the functional components/modules used to carryout dynamic precaching as provided herein may be implemented with software (part of application 412, or otherwise executable by a call from application 412 or the operating system of device 400), hardware such as gate level logic (e.g., FPGA) or a purpose-built semiconductor (e.g., ASIC), or firmware (e.g., embedded routines of a microcontroller). In a more general sense, any suitable combination of hardware, software, and firmware can be used, as will be apparent. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 400, can be integrated into, for example, one or more desktop or laptop computers, workstations, tablets, smart phones, game consoles, set-top boxes, or other such computing devices. Other componentry and modules typical of a typical computing system, such as display drivers, graphics processor, and operating system, are not shown but will be readily apparent in light of this disclosure.

Example Embodiments

Numerous embodiments will be apparent, and features described herein can be combined in any number of configurations. One example embodiment of the present invention provides a computer-implemented method. The method includes presenting content for display, and electronically precaching in a memory a first content set including one or more content objects, wherein a content object of the first content set is selected for precaching based at least in part on a distance of that content object from being displayed and its contribution to an overall memory estimate defining a first precache window size. In response to a change in the content for display, the method continues with electronically precaching in the memory a second content set including one or more content objects, wherein a content object of the second content set is selected for precaching based at least in part on a distance of that content object from being displayed and its contribution to an overall memory estimate defining a second precache window size different from the first precache window size. In some cases, some of the content objects included in the first content set are also included in the second content set. In one such case, electronically precaching in the memory a second content set includes loading into the memory any content objects of the second set selected for precaching but are not yet loaded into the memory, and the selected content objects of the second set that are already loaded into the memory are allowed to remain in the memory. In some cases, the method includes unloading from the memory any content objects included in the first content set that are not included in the second content set. In some cases, the overall memory estimates associated with the first and second precache are less than a maximum memory estimate threshold, and in the event that an actual size in the memory needed by the selected content objects of a given content set exceeds the maximum memory estimate threshold, the method further comprises unloading at least one of the selected content objects from the memory thereby reducing the precache window size associated with that set, and retrying display of that reduced content set, wherein a content object selected for unloading has a lower priority than at least one other content object loaded in the memory. In one such case, the unloading and retrying are carried out in response to an out-of-memory error. In some cases, the content for display comprises some combination of text, image(s), and graphic(s).

Another embodiment of the present invention provides a computer program product having instructions encoded thereon that when executed by one or more processors causes a process to be carried out. The process includes presenting content for display, and electronically precaching in a memory a first content set including one or more content objects, wherein a content object of the first content set is selected for precaching based at least in part on a distance of that content object from being displayed and its contribution to an overall memory estimate defining a first precache window size. In response to a change in the content for display, the process further includes electronically precaching in the memory a second content set including one or more content objects, wherein a content object of the second content set is selected for precaching based at least in part on a distance of that content object from being displayed and its contribution to an overall memory estimate defining a second precache window size different from the first precache window size. In some cases, some of the content objects included in the first content set are also included in the second content set. In some cases, electronically precaching in the memory a second content set includes loading into the memory any content objects of the second set selected for precaching but are not yet loaded into the memory, and any selected content objects of the second set that are already loaded into the memory are allowed to remain in the memory. In some cases, the process further includes unloading from the memory any content objects included in the first content set that are not included in the second content set. In some cases, the overall memory estimates associated with the first and second precache are less than a maximum memory estimate threshold, and in the event that an actual size in the memory needed by the selected content objects of a given content set exceeds the maximum memory estimate threshold, the process further includes unloading at least one of the selected content objects from the memory thereby reducing the precache window size associated with that set, and retrying display of that reduced content set. In one such case, the unloading and retrying are carried out in response to an out-of-memory error. In some cases, the computer program product is part of an application configured to allow for presentation of content that includes any combination of text, images, video, audio, and graphics.

Another embodiment provides a computing system. The system includes an electronic display for presenting content, a processor, and an electronic memory for precaching content to be displayed on the display. The system further includes a dynamic precaching module executable by the processor and configured to: precache in the memory a first content set including one or more content objects, wherein a content object of the first content set is selected for precaching based at least in part on a distance of that content object from being displayed and its contribution to an overall memory estimate defining a first precache window size; and in response to a change in the content for display, precache in the memory a second content set including one or more content objects, wherein a content object of the second content set is selected for precaching based at least in part on a distance of that content object from being displayed and its contribution to an overall memory estimate defining a second precache window size different from the first precache window size. In some cases, some of the content objects included in the first content set are also included in the second content set, and wherein the dynamic precaching module precaches in the memory a second content set by loading into the memory any content objects of the second set selected for precaching but are not yet loaded into the memory, and the dynamic precaching module further allows any selected content objects of the second set that are already loaded into the memory to remain in the memory. In some cases, the dynamic precaching module is further configured to unload from the memory any content objects included in the first content set that are not included in the second content set. In some cases, the overall memory estimates associated with the first and second precache are less than a maximum memory estimate threshold, and in the event that an actual size in the memory needed by the selected content objects of a given content set exceeds the maximum memory estimate threshold, the dynamic precaching module is further configured to unload at least one of the selected content objects from the memory thereby reducing the precache window size associated with that set, and cause retry display of that reduced content set. In some such cases, the unloading and retrying are carried out in response to an out-of-memory error. In some cases, the dynamic precaching module is part of an application (e.g., browser, document viewer, magazine viewer) configured to allow for presentation of content that includes any combination of text, images, video, audio, and graphics.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A computer-implemented method comprising:
   determining an available memory threshold associated with a device on which digital content is to be pre-cached in memory;
   displaying a central content set to a user, wherein the central content set is one of a plurality of content sets that, collectively, define a digital asset;
   identifying a first subset of the plurality of content sets that, when pre-cached in memory on the device, consume a first quantity of memory, wherein the first quantity of memory is less than the available memory threshold;
   pre-caching the first subset of the plurality of content sets in memory on the device;
   detecting that the available memory threshold has been modified, wherein the available memory threshold is modified in response to interaction by the user to display a portion of the digital asset different from the central content set;
   in response to detecting that the available memory threshold has been modified, identifying a second subset of the plurality of content sets that, when pre-cached in memory on the device, will consume a second quantity of memory, wherein the second quantity of memory is less than the modified available memory threshold; and
   pre-caching the second subset of the plurality of content sets in memory on the device.

2. The computer-implemented method of claim 1, wherein a particular one of the content sets is included in both the first subset and the second subset.

3. The computer-implemented method of claim 1, wherein pre-caching the second subset of the plurality of content sets further comprises loading into memory only those content sets that are not included in the first subset, but that are included in the second subset.

4. The computer-implemented method of claim 1, wherein pre-caching the second subset of the plurality of content sets further comprises:
- removing from memory those content sets that are included in the first subset, but that are not included in the second subset; and
- loading into memory only those content sets that are not included in the first subset, but that are included in the second subset.

5. The computer-implemented method of claim 1, further comprising, in response to detecting a low memory condition before pre-caching the first subset, removing a selected one of the content sets from the first subset, wherein the content set selected for removal has a lower priority than other content sets remaining in the first subset.

6. The computer-implemented method of claim 1, further comprising, in response to detecting an out-of-memory error that occurs before pre-caching the second subset, removing a selected one of the content sets from the second subset, wherein the content set selected for removal has a lower priority than other content sets remaining in the second subset.

7. The computer-implemented method of claim 1, wherein each one of the plurality of content sets is assigned a priority with respect to the central content set.

8. The computer-implemented method of claim 1, wherein:
- the digital asset is an electronic publication; and
- each of the plurality of content sets corresponds to a page of the electronic publication.

9. A non-transitory computer readable medium having instructions encoded thereon that, when executed by one or more processors, cause a memory management process to be carried out, the memory management process comprising:
- determining an available memory threshold associated with a device on which digital content is to be pre-cached in memory;
- displaying a central content set to a user, wherein the central content set is one of a plurality of content sets that, collectively, define a digital asset;
- identifying a first subset of the plurality of content sets that, when pre-cached in memory on the device, consume a first quantity of memory, wherein the first quantity of memory is less than the available memory threshold;
- pre-caching the first subset of the plurality of content sets in memory on the device;
- modifying the available memory threshold in response to interaction by the user to display a portion of the digital asset different from the central content set;
- detecting that the available memory threshold has been modified;
- in response to detecting that the available memory threshold has been modified, identifying a second subset of the plurality of content sets that, when pre-cached in memory on the device, will consume a second quantity of memory, wherein the second quantity of memory is less than the modified available memory threshold; and
- pre-caching the second subset of the plurality of content sets in memory on the device.

10. The non-transitory computer readable medium of claim 9, wherein a particular one of the content sets is included in both the first subset and the second subset.

11. The non-transitory computer readable medium of claim 9, wherein the instructions form part of an application configured to allow for presentation of content selected from a group consisting of textual content, graphical content, video content, and audio content.

12. The non-transitory computer readable medium of claim 9, wherein:
- the memory management process further comprises, in response to detecting a low memory condition before pre-caching the second subset, removing a selected one of the content sets from the second subset; and
- the content set selected for removal has a lower priority than other content sets remaining in the second subset.

13. The non-transitory computer readable medium of claim 9, wherein:
- each one of the plurality of content sets has associated therewith a priority with respect to the central content set;
- the memory management process further comprises, in response to detecting an out-of-memory error that occurs before pre-caching the first subset, removing a selected one of the content sets from the first subset; and
- the content set selected for removal has a lower priority than other content sets remaining in the first subset.

14. The non-transitory computer readable medium of claim 9, wherein pre-caching the second subset of the plurality of content sets further comprises:
- removing from memory those content sets that are included in the first subset, but that are not included in the second subset; and
- loading into memory only those content sets that are not included in the first subset, but that are included in the second subset.

15. A computing device comprising:
- a processor;
- a display device that is operatively coupled to the processor and that is capable of presenting a digital asset that comprises a plurality of content sets;
- a memory device that is operatively coupled to the processor and that is capable of pre-caching at least one of the content sets that comprise the digital asset; and
- a dynamic pre-caching module that, when executed by the processor, is configured to:
  - determine an available memory threshold associated with the memory device,
  - render a central content set for a user on the display device, wherein the central content set is one of the plurality of content sets that comprise the digital asset,
  - identify a first subset of the plurality of content sets that, when pre-cached in the memory device, consume a first quantity of memory in the memory device that is less than the available memory threshold,
  - pre-cache the first subset of the plurality of content sets in the memory device,
  - detect that the available memory threshold has changed, wherein the available memory threshold is changed in response to interaction by the user to render a portion of the digital asset different from the central content set,
  - in response to detecting that the available memory threshold has changed, identify a second subset of the plurality of content sets that, when pre-cached in the memory device, will consume a second quantity of memory in the memory device that is less than the modified available memory threshold, and
  - pre-cache the second subset of the plurality of content sets in the memory device.

16. The computing device of claim 15, wherein:
each one of the plurality of content sets has associated therewith a priority with respect to the central content set;
the dynamic pre-caching module is further configured to, in response to detecting a low memory condition before pre-caching the second subset, remove a selected one of the content sets from the second subset; and
the content set selected for removal has a lower priority than other content sets remaining in the second subset.

17. The computing device of claim 15, wherein:
the dynamic pre-caching module is further configured to, in response to detecting an out-of-memory error that occurs before pre-caching the first subset, removing a selected one of the content sets form the first subset; and
the content set selected for removal has a lower priority than other content sets remaining in the first subset.

18. The computing device of claim 15, wherein the dynamic pre-caching module forms part of an application configured to allow for presentation of content selected from a group consisting of textual content, graphical content, video content, and audio content.

19. The computing device of claim 15, wherein the dynamic pre-caching module is further configured to:
remove from the memory device those content sets that are included in the first subset, but that are not included in the second subset; and
load into the memory device only those content sets that are not included in the first subset, but that are included in the second subset.

20. The computing device of claim 15, wherein:
each one of the plurality of content sets has associated therewith a priority with respect to the central content set; and
the priority associated with a particular content set is based at least in part on a distance of the particular content set from the central content set.

* * * * *